(12) United States Patent
Nairn et al.

(10) Patent No.: US 9,425,963 B2
(45) Date of Patent: Aug. 23, 2016

(54) SECURING ELECTRONIC CONTROL UNITS USING MESSAGE AUTHENTICATION CODES

(71) Applicant: GM Global Technology Operations LLC, Detroit, MI (US)

(72) Inventors: David Nairn, Plymouth, MI (US); Thomas Forest, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 14/221,831

(22) Filed: Mar. 21, 2014

(65) Prior Publication Data

US 2015/0270968 A1 Sep. 24, 2015

(51) Int. Cl.
*H04L 9/32* (2006.01)

(52) U.S. Cl.
CPC ............... *H04L 9/32* (2013.01); *H04L 9/3242* (2013.01); *H04L 2209/84* (2013.01)

(58) Field of Classification Search
CPC ....... H04L 9/3242; H04L 9/32; H04L 69/04; H04W 28/065; H04J 3/16; H04J 3/22
USPC .................. 713/181; 370/470, 473, 474, 476
See application file for complete search history.

(56) References Cited

U.S. PATENT DOCUMENTS

| 6,941,460 B2 * | 9/2005 | Carro et al. .................. 713/170 |
| 2005/0033960 A1 * | 2/2005 | Vialen et al. ................. 713/170 |
| 2010/0169658 A1 * | 7/2010 | Ghouti et al. ................ 713/181 |
| 2014/0310530 A1 * | 10/2014 | Oguma et al. ................ 713/181 |

* cited by examiner

*Primary Examiner* — Thanhnga B Truong
(74) *Attorney, Agent, or Firm* — Christopher DeVries; Reising Ethington P.C.

(57) ABSTRACT

A method of securing electronic control units (ECUs) using message authentication codes includes receiving a message authentication code (MAC) at an ECU; determining that the length of the MAC is greater than or equal to a predefined bit value; authenticating the MAC when the length of the MAC has been determined to be equal to or greater than the predefined bit value; and rejecting the MAC when the length of the MAC has been determined to be less than the predefined bit value.

16 Claims, 2 Drawing Sheets

SECURING ELECTRONIC CONTROL UNITS USING MESSAGE AUTHENTICATION CODES

TECHNICAL FIELD

The present invention relates to authenticating data or messages communicated to electronic control units (ECUs) and, more particularly, to using message authentication codes (MACs) to authenticate the data or messages.

BACKGROUND

Message Authentication Codes (MACs) can be used to authenticate data or messages communicated between two electronic devices, such as electronic control units (ECUs). To ensure that the data transmitted to an ECU is authentic, a MAC can be generated by a sending ECU using a MAC algorithm, which is a function of the data to be sent and a secret key. Example MAC algorithms include HMAC, a hash function-based message authentication algorithm, and CMAC, a block cipher-based message authentication algorithm. When used to authenticate communication between ECUs, the data is sent to a receiving ECU along with the generated MAC. The receiving ECU has its own copy of the secret key and MAC algorithm, which the receiving ECU can use to calculate a comparison MAC using the received data, its own copy of the secret key and the MAC algorithm. When the comparison MAC calculated by the receiving ECU matches the MAC it was sent, the receiving ECU can determine that the data and/or message is authentic and output a "yes" answer confirming this. In contrast, when the comparison MAC calculated by the receiving ECU does not match the MAC received, a "no" answer can be output. In this sense, the receiving ECU outputs a binary "yes" or "no" response to whether or not the comparison MAC matches the received MAC. The process of determining if the MAC of a message is correct and outputting a binary "yes" or "no" response can be referred to as MAC verification. Although the MAC verification process can calculate the correct MAC (based on the data and the appropriate secret key) it need not expose the correct MAC outside of the verification process. As a consequence, it is possible to define a verification process that would not allow the efficient generation of correct MACs if the secret key is not known to the party requesting the verification of the MAC for a particular message.

SUMMARY

According to an embodiment, there is provided a method of securing electronic control units (ECUs) using message authentication codes. The steps include receiving a message authentication code (MAC) at an ECU; determining that the length of the MAC is greater than or equal to a predefined bit value; authenticating the MAC when the length of the MAC has been determined to be equal to or greater than the predefined bit value; and rejecting the MAC when the length of the MAC has been determined to be less than the predefined bit value.

According to another embodiment, there is provided a method of securing electronic control units (ECUs) using message authentication codes. The steps include receiving a plurality of secret keys at an ECU; specifying a predefined message authentication code (MAC) length for each of the plurality of secret keys; receiving a MAC at the ECU; selecting one of the plurality of secret keys to verify the MAC; comparing the predefined MAC length for the selected key with the length of the received MAC; authenticating the received MAC when the length of the received MAC is greater than or equal to the predefined MAC length specified for the selected key; and rejecting the received MAC when the length of the received MAC is less than the predefined MAC length specified for the selected key.

According to yet another embodiment, there is provided a method of securing electronic control units (ECUs) using message authentication codes. The steps include receiving a plurality of secret keys at an ECU used by a vehicle system module (VSM); specifying a predefined message authentication code (MAC) length for the ECU used by the VSM; receiving a MAC sent from within a vehicle at the ECU; determining whether the length of the MAC is greater than or equal to the predefined MAC length for the ECU; authenticating the MAC when the length of the MAC has been determined to be equal to or greater than the predefined bit value; and rejecting the MAC when the length of the MAC is less than the predefined bit value.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
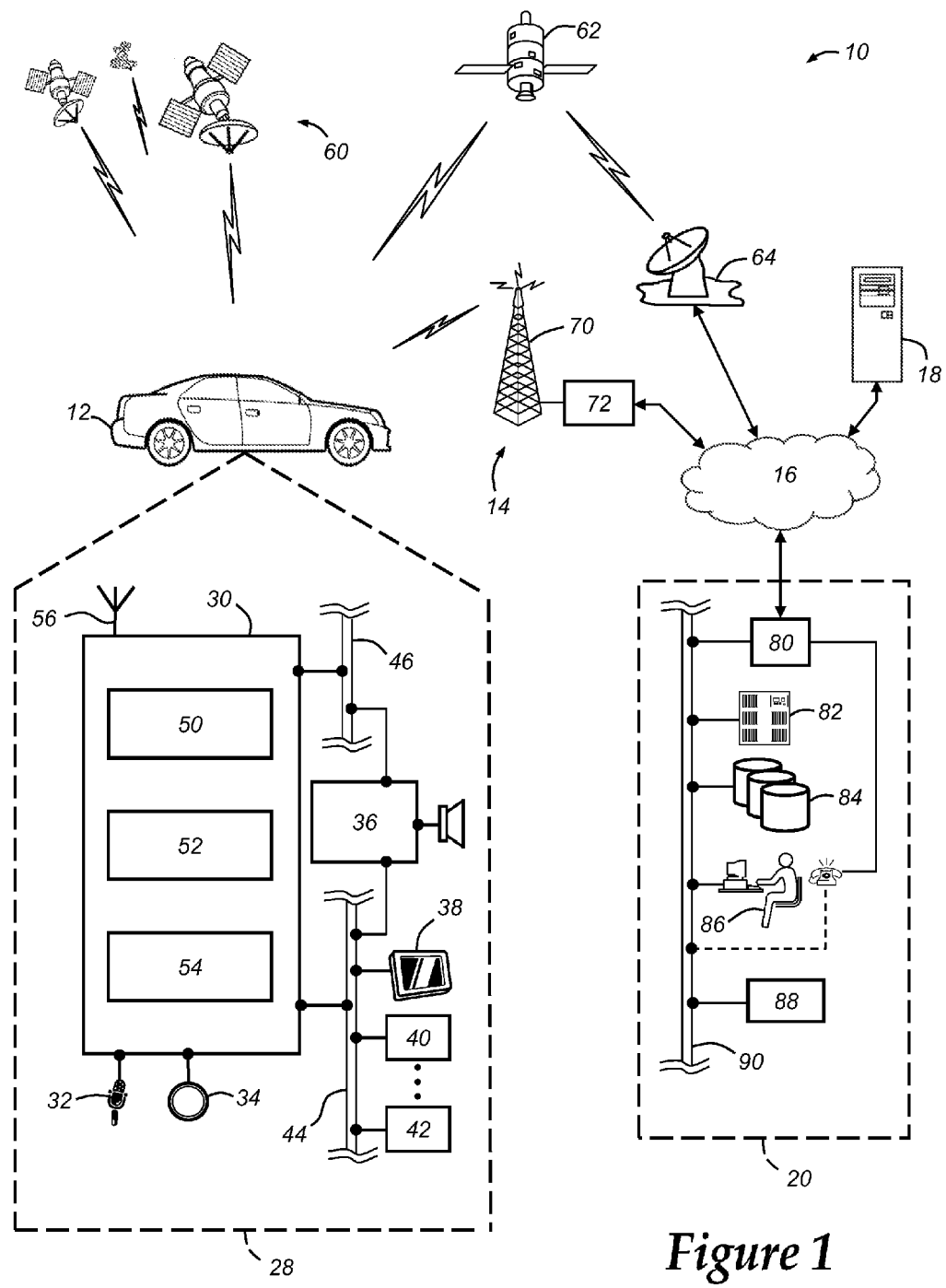
FIG. 1 is a block diagram depicting an embodiment of a communications system that is capable of utilizing the method disclosed herein.

The system and method described below secures electronic control units (ECUs) using message authentication codes in a manner preventing efficient reconstruction of a correct MAC via a bit-by-bit interrogation of a message authentication code (MAC) verification process in a receiving ECU. Sometimes, the MAC generated by the sending ECU is too large or includes too many bits to be transmitted to the receiving ECU. The cryptographic properties of certain message authentication code algorithms allow the sending ECU to truncate the length of the MAC sent such that it only includes a subset, for example the most-significant bits, of the original MAC. When truncation occurs, the sending ECU can include with the truncated MAC an instruction or indicator specifying the truncated length of the MAC measured in bits. The receiving ECU can then be instructed to use the specified truncated length in its MAC verification process, that is, to only compare a specified-length subset of the total MAC length when comparing the calculated MAC, which will always be the full length of the MAC algorithm, with the received MAC which has been truncated.

However, when the receiving ECU accepts instructions relating to the length of the MAC, it can permit an attacker or sender to efficiently interrogate the receiving ECU and discover the MAC for a message even if the attacker does not know the correct MAC, or the secret key. This can be accomplished by generating a one-bit MAC with an instruction that the MAC length has been truncated to one bit. After receiving the one-bit MAC, the receiving ECU then outputs a "yes" if the bit is correct or a "no" if the bit is not correct.

Regardless of whether the attacker guesses the correct value for the bit, the attacker will know with certainty the MAC value for that particular bit based on the response from the receiving ECU. If the receiving ECU outputs "yes," the attacker knows he guessed correctly. Even if the output is "no" the attacker changes the binary value of the bit and now has the correct value of that portion of the MAC. The attacker can then send another MAC to the receiving ECU with an instruction that the MAC has been truncated to two bits. This MAC sent by the attacker now has the correct value for the first bit and attempts to determine the correct value of the second bit. Again, regardless of the yes/no output generated by the receiving ECU, the attacker can then learn the value of the second bit. The attacker can repeat this process for the remaining bits of the MAC until he has discovered all of the bit values for a valid MAC.

The receiving ECU can be programmed to compare the bit length of the received MAC with a predefined minimum message authentication code (MAC) length or predetermined bit value and reject the MAC if its bit length is not the same as or greater than the length or value of the predefined minimum MAC length programmed at the ECU. When the predefined MAC length is longer than one or several bits (e.g., ≥16 bits), the attacker must guess correctly from a larger pool of possible choices (16 bits=$2^{16}$ possible choices=65,536) than when one bit can be specified (1 bit=2 possible choices). Such a system can prevent attackers from interrogating the receiving ECU one bit at a time and instead force the attacker to correctly guess multiple bit values simultaneously, which is much more difficult than guessing a one bit value.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, electronic control units (ECUs), and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. The functions of the VSM 42 can be carried out by one or more ECUs included with the VSM 42. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
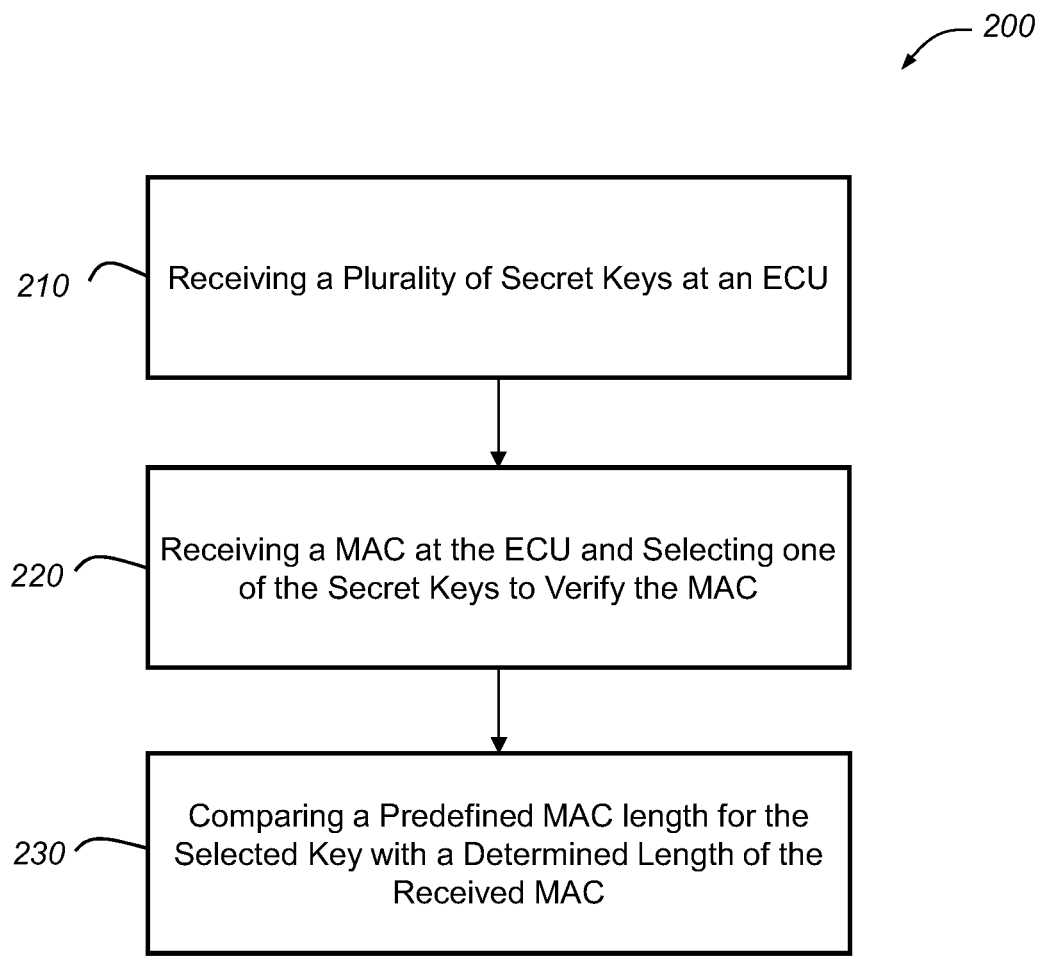
FIG. 2 is a flow chart depicting one embodiment of a method of securing electronic control units (ECUs) using symmetric key encryption.

Turning now to FIG. 2, there is shown a method 200 of securing electronic control units (ECUs) using message authentication codes. The method 200 will be described in terms of an intra-vehicle transmission of a MAC between two ECUs. In one example of how this can be implemented, the vehicle telematics unit 30 can act as a sending ECU while the VSM 42 can act as a receiving ECU. As such, the communications can be carried out entirely within the vehicle 12. However, other electronic devices located within or outside of the vehicle 12 can act as sending and receiving ECUs and be used to implement the method described herein. Both the sending ECU and the receiving ECU can be loaded with a secret key and a MAC algorithm that are used to create MACs that can be used to verify data or messages sent with the MACs. The secret key can be a unique piece of cryptographic data used as an input to the MAC algorithm. The secret key can be entered into the MAC algorithm at the sending ECU along with the data or message to be sent. The MAC algorithm at the sending ECU can then generate or output a MAC to send to the receiving ECU with the data or message. The receiving ECU can then use the data or message it receives along with a copy of the secret key to determine authenticity of the data or message. When the data or message is fed into the MAC algorithm at the receiving ECU with the secret key, a comparison MAC can be created. If the comparison MAC generated at the receiving ECU matches the received MAC generated by the sending ECU, then the data or message can be deemed valid by the receiving ECU. Otherwise, if the comparison MAC does not match the received MAC, the data or message can be determined to be not valid.

The method 200 begins at step 210 by receiving a plurality of secret keys at an ECU and specifying a predefined message authentication code (MAC) length for each of the plurality of secret keys. The predefined MAC length can be a predetermined bit value representing the number of bits a valid and acceptable MAC comprises. As implemented, the predefined MAC length can be 16 bits, 32 bits, or more. When the predefined MAC length is established at an ECU, it can be saved in non-volatile memory as a value such that the processing capability of the ECU accesses the value using an application programming interface (API) and can compare it with the length of MACs that are received at the receiving ECU. In this example, the predefined MAC length can be a global value that is applied to all MACs received. But other implementations can be configured to apply the predefined MAC length only to MACs that have been determined to be truncated. For example, some MACs can exist originally as 128 bits but later be truncated to some value less than 128 bits. When the MAC is sent from the sending ECU, the MAC can include a data value representing the number of bits the MAC comprises. The receiving ECU can then identify the length of the MAC it receives using the data value.

Also, while the ECUs have been described as having one secret key, each ECU (both sending and receiving ECUs) can store a plurality of secret keys. And in some implementations, each secret key can be associated with its own predefined MAC length rather than using a global MAC length for all keys. Thus, the predefined MAC lengths can be different from one another. For example, in one implementation, secret keys 1-20 can be stored in each of the sending and receiving ECUs. The secret keys can each be associated with an index value indicating which key to use and a predefined MAC length. The sending ECU can then select one of the keys, for example key 7, that can be associated with a MAC length of 32 bits. The sending ECU can then use key 7 and the data or message to be sent to create a MAC. The sending ECU then sends the created MAC along with the index value instructing for the receiving ECU to select key 7 along with the data or message to the receiving ECU. Using the vehicle telematics unit 30 and the VSM 42 as example ECUs, the MAC created by the sending ECU (e.g., vehicle telematics unit 30) and data can transmitted via the communications bus 44. The method 200 proceeds to step 220.

At step 220, the MAC is received at the ECU and one of the plurality of secret keys is selected to verify the MAC. When the MAC created by the sending ECU arrives at the receiving ECU, it can determine which key should be selected to verify the MAC. Continuing the example above, the receiving ECU can read the instruction or index value accompanying the MAC that commands the receiving ECU to select key 7 to create the comparison MAC. When the receiving MAC selects key 7, the receiving ECU can also read the MAC length associated with key 7, in this case 32 bits. The receiving ECU can now check to ensure that the received MAC—even if truncated—is no less than 32 bits. While method 200 has been described using 20 different secret keys, it should be appreciated that a system can be implemented in which a single secret key is used at the sending and receiving ECUs or a different number of secret keys. And apart from the number of keys used, the method 200 can also include a secure mechanism for replacing one or more secret keys stored in the sending and receiving ECUs. The secret keys can be replaced by direct wire connection with an ECU or can be wirelessly sent, such as from the call center 20 to the vehicle telematics unit 30. The method 200 proceeds to step 230.

At step 230, the predefined MAC length for the selected key is compared with the length of the received MAC. The received MAC can be authenticated when the length of the received MAC is greater than or equal to the predefined MAC length specified for the selected key. After receiving the MAC from the sending ECU, the receiving ECU can read the MAC and determine the number of bits that make up the MAC. At that point, the receiving ECU can determine that the MAC is too short and stop further processing. Or the receiving ECU can determined that the received MAC is long enough and then create a comparison MAC to determine if the accompanying data or message is authentic. In some implementations, the ECU can compare the length of the received MAC with the predetermined MAC length only when the receiving ECU determines that the received MAC has been truncated. However, in other implementations a determination can be made each time the receiving ECU receives a MAC regardless of whether it has been determined to be truncated. The determined number of bits of the received MAC can then be compared with the predetermined MAC length that is globally applied to all MACs received or to the predetermined MAC length associated with the key used to create the received and comparison MAC. When the length of the MAC received equals or is greater than the predetermined MAC length, the receiving ECU can continue processing the MAC to determine whether it matches the comparison MAC. However, if the length of the MAC received is less than the predetermined MAC length, then the receiving ECU can reject the MAC received, determine that the received data or message is not authentic, and the method 200 can end. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:
1. A method of securing electronic control units (ECUs) using message authentication codes, comprising the steps of:
  (a) receiving a message authentication code (MAC) at an ECU;
  (b) comparing, at the ECU, the length of the MAC with a predefined bit value;
  (c) ending further processing of the received MAC when the length of the MAC has been determined to be less than the predefined bit value; and
  (d) creating a comparison MAC to determine if data accompanying the MAC is authentic when the length of the MAC has been determined to be equal to or greater than the predefined bit value.

2. The method of claim 1, further comprising the step of sending the MAC to the ECU, wherein communication of the MAC occurs within a vehicle.

3. The method of claim 1, further comprising the step of authenticating the MAC using a secret key.

4. The method of claim 1, further comprising the step of providing the ECU with a plurality of secret keys.

5. The method of claim 4, further comprising the step of associating a predefined bit value with each of the plurality of secret keys.

6. The method of claim 1, wherein the length of the MAC is determined from a data value received with the MAC.

7. The method of claim 1, wherein the received MAC is truncated.

8. A method of securing electronic control units (ECUs) using message authentication codes, comprising the steps of:
  (a) receiving a plurality of secret keys at an ECU;
  (b) specifying a predefined message authentication code (MAC) length for each of the plurality of secret keys;
  (c) receiving a MAC at the ECU;
  (d) selecting one of the plurality of secret keys to verify the MAC at the ECU;
  (e) comparing at the ECU the predefined MAC length for the selected key with the length of the received MAC;

(f) ending further processing of the received MAC when the length of the received MAC is less than the predefined MAC length specified for the selected key; and (g) creating a comparison MAC when the length of the MAC has been determined to be equal to or greater than the predefined bit value to determine if the accompanying data is authentic.

9. The method of claim 8, further comprising the step of sending the MAC to the ECU, wherein communication of the MAC occurs within a vehicle.

10. The method of claim 8, further comprising the step of associating a predefined bit value with each of the plurality of secret keys.

11. The method of claim 8, wherein the length of the received MAC is determined from a data value received with the MAC.

12. The method of claim 8, wherein the received MAC is truncated.

13. A method of securing electronic control units (ECUs) using message authentication codes, comprising the steps of:

(a) receiving a plurality of secret keys at an ECU used by a vehicle system module (VSM);

(b) specifying a predefined message authentication code (MAC) length for the ECU used by the VSM;

(c) receiving a MAC sent from within a vehicle at the ECU;

(d) determining at the ECU whether the length of the MAC is greater than or equal to the predefined MAC length for the ECU;

(e) ending further processing of the received MAC when the length of the MAC is less than the predefined bit value; and (f) creating a comparison MAC when the length of the MAC has been determined to be equal to or greater than the predefined bit value to determine if the accompanying data is authentic.

14. The method of claim 13, further comprising the step of associating a predefined bit value with each of the plurality of secret keys.

15. The method of claim 13, wherein the length of the received MAC is determined from a data value received with the MAC.

16. The method of claim 13, wherein the received MAC is truncated.

* * * * *